United States Patent [19]

Bernauer

[11] Patent Number: 4,917,011
[45] Date of Patent: Apr. 17, 1990

[54] PROCESS AND DEVICE FOR PRINTING A SUCCESSIVE ROW OF NUMBERS OF BAR CODE 2/5 INTERLEAVED

[75] Inventor: Joachim Bernauer, Oerlinghausen, Fed. Rep. of Germany

[73] Assignee: Loewe Druck & Verlag GmbH, Bielefeld, Fed. Rep. of Germany

[21] Appl. No.: 298,759

[22] Filed: Jan. 19, 1989

[30] Foreign Application Priority Data

Jan. 22, 1988 [DE] Fed. Rep. of Germany ....... 3801861

[51] Int. Cl.⁴ ............................................... B41J 3/00
[52] U.S. Cl. ..................................... 101/92; 101/483; 101/490; 400/103
[58] Field of Search .................. 101/483, 219, 142, 92, 101/109, 490; 400/103

[56] References Cited

U.S. PATENT DOCUMENTS

| | | | |
|---|---|---|---|
| 3,470,357 | 9/1969 | Ritzerfeld et al. | 101/483 X |
| 3,823,665 | 7/1974 | Davis et al. | 101/92 X |
| 3,939,766 | 2/1976 | Darwin | 101/92 |
| 4,092,020 | 5/1978 | Blessing | 101/92 X |
| 4,406,222 | 9/1983 | Holland-Letz et al. | 101/92 |
| 4,473,008 | 9/1984 | Heyman | 101/109 X |
| 4,541,333 | 9/1985 | Sillars | 101/142 X |
| 4,621,575 | 11/1986 | Jeschke | 101/142 X |
| 4,628,816 | 12/1986 | Six | 101/483 |

OTHER PUBLICATIONS

Der Strich–Code Katalog; Datalogic L Optic Electronics; Hoffmann Industrievertretungen GmbH; pp. 6, 8, 11, 14 and 15.

Primary Examiner—Clifford D. Crowder
Attorney, Agent, or Firm—Oblon, Spivak, McClelland, Maier & Neustadt

[57] ABSTRACT

A process for printing a successive row of numbers of bar code 2/5 interleaved provides that the narrow bar/-wide bar printing ratio is set at 2:1. A code field is divided into narrow bar areas and the latter are in each case assigned alternately to two different printing units. The printing units exhibit, in the bar areas assigned to them, adjustable printing forms in all bar combinations. The code is printed in exact register by the two printing units in succession.

6 Claims, 3 Drawing Sheets

PROCESS AND DEVICE FOR PRINTING A SUCCESSIVE ROW OF NUMBERS OF BAR CODE 2/5 INTERLEAVED

BACKGROUND OF THE INVENTION

Field of the Invention

The invention relates to a process for printing a successive row of numbers of bar code 2/5 interleaved and a device for performing the process.

Bar codes are being used increasingly for machine-readable marking of goods. Various codes exist, of which the so-called 2/5 interleaved offers the advantage of a high information density, since it uses not only the arrangement and size of the bars but also those of the intermediate gaps as information carriers.

With most numeric or alphanumeric codes, the individual numbers or letters are coded by a finite group of bars that are then followed by another group for the next number or the next letter. With coding with a successive row of numbers, therefore, e.g., with numbering of a series of articles from 01 to 99, a counter, usual in principle, can thus be used in which the units, then the tens and optionally the hundreds can be shifted stepwise at each printing operation.

The high information density of code 2/5 interleaved (overlapped) is based essentially on the fact that in each case two numbers are coded by a closed group of bars, the first of which is reproduced by the size and arrangement of the bars and the second by the size and arrangement of the spaces. With a usual mechanical counter, a printing of a successive row of numbers is thus not possible, since a stepwise change in the size and arrangement of the bars simultaneously changes the size and arrangement of the spaces contained between these bars, i.e., the two numbers contained in one bar group interleave in each other and form one unit. With printing of successive numbers 01 to 99, a print wheel with 99 different code formats would thus theoretically be necessary.

It is indeed easily possible to store the different code formats in a data-processing unit and to print them out with a laser printer or the like, but printers of this type achieve only about 1,000 impressions per hour, while with printing of a successive row of numbers with a mechanical printing unit, at least 30,000 printing operations per hour are possible.

The invention is thus based on the project of providing a process and a device that make it possible to print the 2/5 interleaved code in a successive row of numbers with a mechanical printing unit with limited construction expense.

SUMMARY OF THE INVENTION

This object is achieved according to the invention in a process of the initially mentioned type that is characterized in that the narrow bar/wide bar printing ratio is set at 2:1, in that the code field is divided into narrow bar areas and in each case the latter are assigned alternately to two different printing units, in that the printing units exhibit, in the bar areas assigned to them, adjustable printing forms in all bar combinations and in that the code is printed in exact register by the two printing units in succession.

With the code involved here, the so-called printing ratio, i.e., the ratio of the width of the narrow bars or spaces to the wide bars, can be 1:2 or 1:3. In the process according to the invention, the printing ratio of 1:2 is provided.

The code field needed for the representation of two numbers can be divided—except for the bar always present at the beginning and the space always provided at the end—into 12 areas with the width of a narrow bar or a narrow space. These 12 fields are each assigned alternately to one of the two printing units so that, i.e., each can print a maximum of 6 narrow bars, but optionally also a lesser number of bars. This would theoretically make necessary, for every possible combination of bars, two printing units each with $2^6$ or 64 successively adjustable printing formats. Preferably, both print wheels are therefore again divided once in the middle, so that they each carry a maximum of three bar formats and the necessary combinations or positions of the print wheels amount to $2^3$ or 8.

In the spaces of the print wheels that are not needed for printing, in each case gripping springs can be provided for the individual stop positions or the like.

Printing is performed preferably with a so-called satellite printing system, in which several printing units are assigned to a common counterpressure cylinder, so that the material to be printed is transferred precisely and reliably and a printing exactly in register occurs.

The bars are preferably made in the print format, on one side, i.e., on the right or left, about 10% thicker than the standard. This thickening does not impair the legibility and results in two adjacent bars always appearing as a closed wide bar, and in fact even if somewhat greater printing tolerances during interaction of both printing units are to be expected.

When using a satellite printing system, both printing units can be inked by the same inking unit, so that the bars of both printing units appear in the same color intensity and adjacent narrow bars appear as one continuous, wide bar.

BRIEF DESCRIPTION OF THE DRAWINGS

Preferred embodiments of the invention are explained below in more detail by means of the accompanying drawing.

DESCRIPTION OF THE PREFERRED EMBODIMENT

Figure 1:
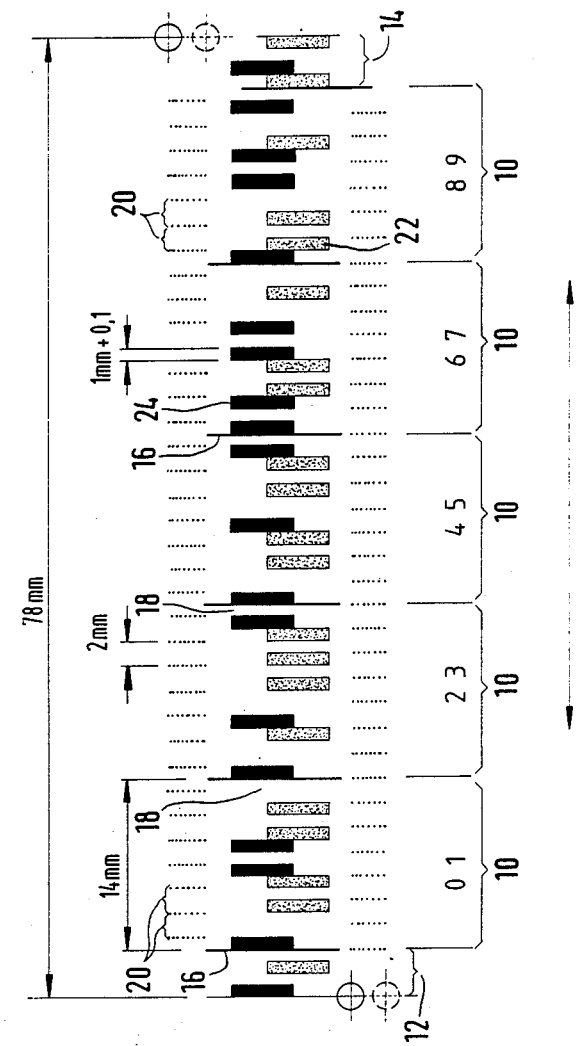
FIG. 1 is an enlarged representation of a print to be understood as an example of a 2/5 interleaved code with print of the two printing units staggered for clarity.

In FIG. 1, the code fields needed in each case to represent two numbers are combined by braces and designated by 10. The bars printed by both printing units are represented staggered for clarity, but in practice are adjacent and further exhibit the same color intensity. The code shown in FIG. 1 contains 5 code fields 10 and thus permits the representation of a 10-place number.

At the beginning of a code, a start code 12 is provided and, at the end, a stop code 14 that indicate, during mechanical reading, the direction in which the numbers are to be read. The start and stop codes are always the same, so that the bars needed in this connection can be provided permanently in both printing units.

At the beginning of each code field, on the left in FIG. 1, a narrow bar 16 is provided in each case so that this bar can also be built permanently into one of the two printing units. At the end there is always a small space 18, which also always remains empty. Between bar 16 and space 18 there are six fields 20, which are separated by dotted lines and exhibit the width of one wide bar or two narrow bars and thus yield a total of 12 narrow bar areas or space areas. In the example represented, in each case the first half of fields 20 is assigned to the second printing unit, which shifted downward in FIG. 1 is printing, as shown for example by bar 22, and the second half is assigned to the first printing unit, as shown by bar 24. This alternating sequence continues over all six fields 20.

Figure 2:
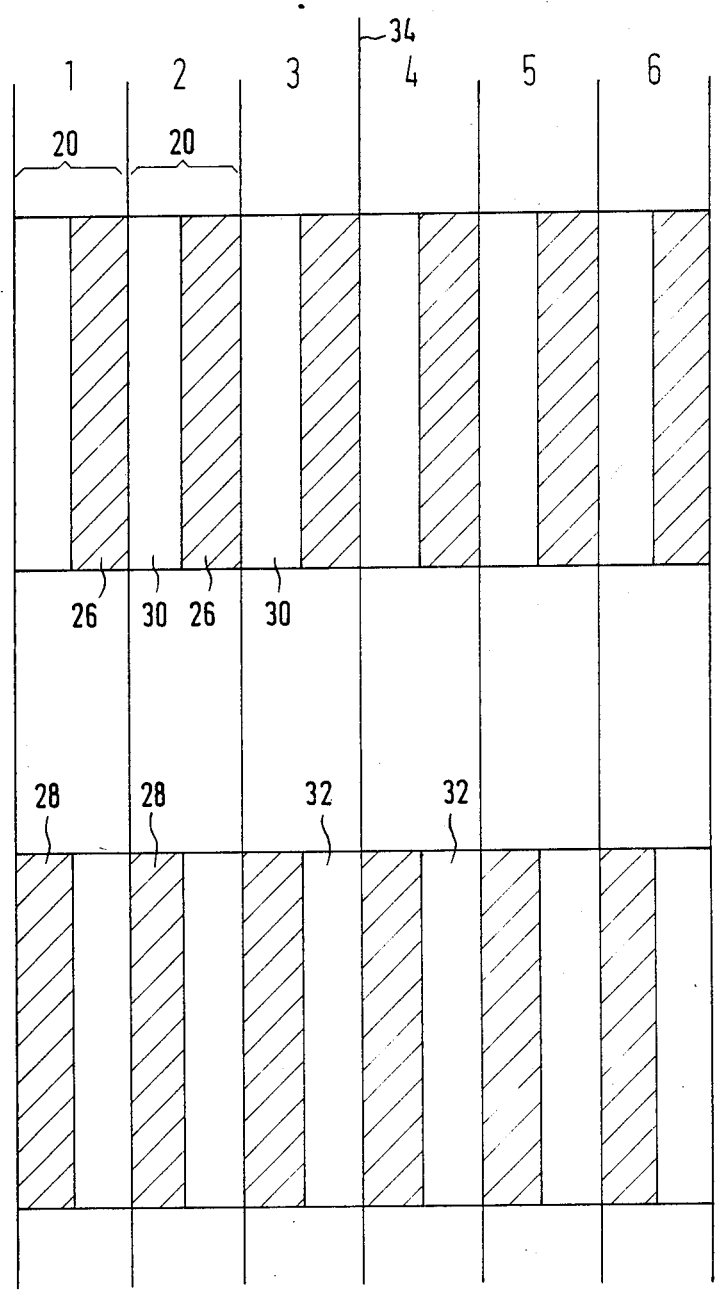
FIG. 2 is another enlarged representation of the code field for two numbers interleaved in one another.

In FIG. 2, six fields 20 of a code field 10 provided for two numbers is represented in greater enlargement and for the two printing units in an exploded view. In the top area, in FIG. 2, bar areas 26 of fields 20 assigned to the first printing unit and, in the bottom area, bar areas 28 of the second printing unit are represented hatched. These bar areas can be printed as a whole or in any subcombination by both printing units. On the other hand, space areas 30, 32 always remain empty with both printing units, so that stop springs or the like can be placed here.

To reduce the number of possible bar combinations on both printing units, it is suitable to divide the latter lengthwise along line 34, so that for each component printing unit only three bars and their subcombinations, i.e., a total of eight bar combinations remain, which require a counter with only eight control positions.

According to the invention, both printing units can be made the same to a large extent, since the only difference consists in the fact that the bar positions are offset by half the width of a field 20. The additional construction expense for the production of a second printing unit can thus be kept within limits.

This advantage is not offered with a conceivable modification of the invention in which all narrow bars are printed by a first printing unit and all wide bars by a second one. In this case, the first printing unit needs a counter with eight positions and the second a counter with 12 positions, and the counters must consequently be made very different overall.

Figure 3:
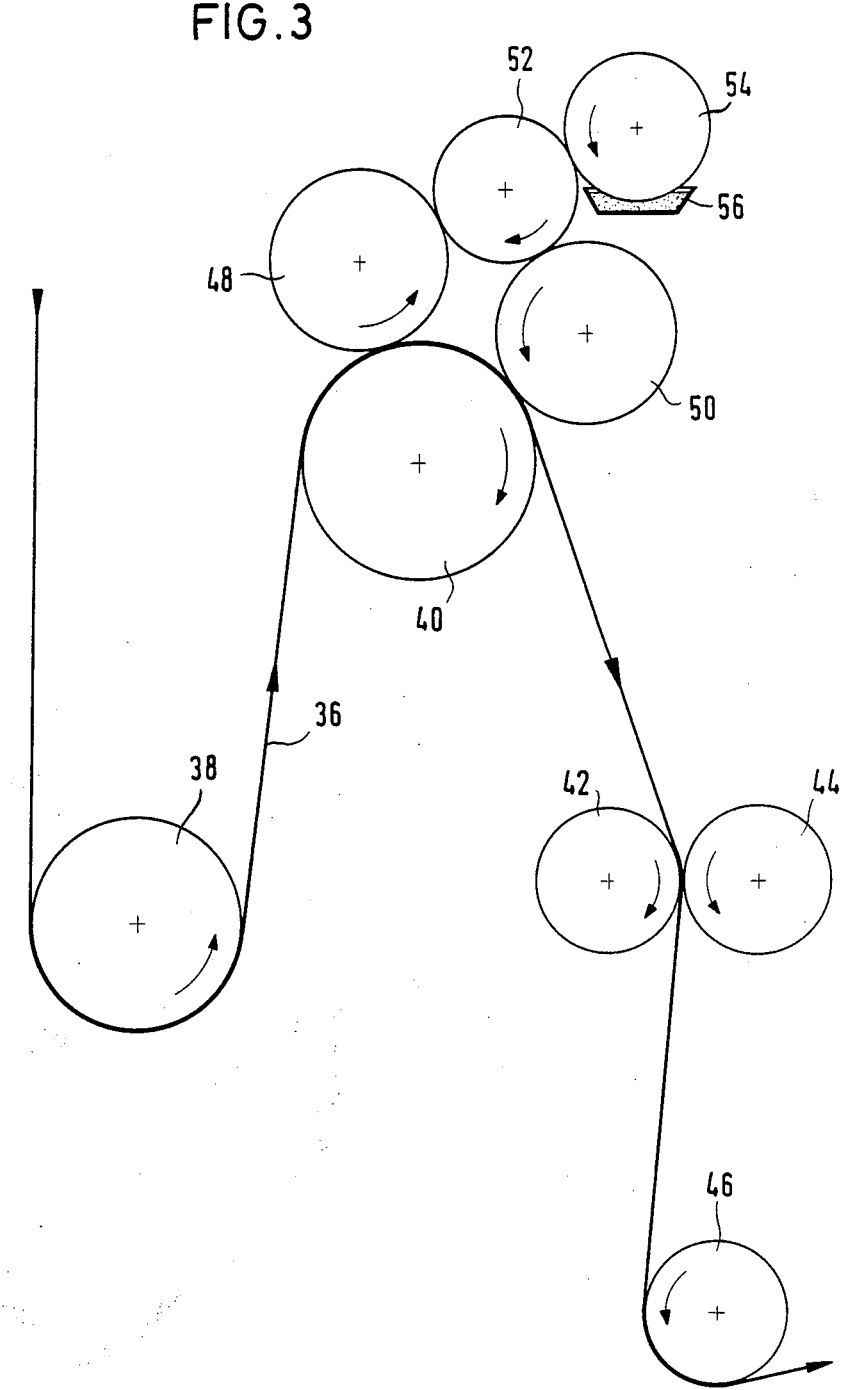
FIG. 3 is a diagrammatic representation of a satellite printing unit for performing the invention.

FIG. 3 diagrammatically shows a printing system according to the invention in which a material web is conveyed over a guide roller 38 and a counterpressure roller 40 and then between two driving rollers 42, 44 and another guide roller 46. To counterpressure roller 40 there are assigned first and second printing rollers 48, 50 with the numbering units or counters according to the invention. Both printing rollers 48, 50 are inked by a common inking roller 52, which takes up printing ink from a bath 56 by an intermediate roller 54. Since both printing rollers 48, 50 are inked by one and the same inker 52, 54, 56, the printing of the bars of both printing units always appears in the same intensity.

What is claimed:

1. A process for printing a successive row of numbers of bar code 2/5 interleaved comprising the steps of:
    setting a narrow bar/wide bar printing ratio at 2:1,
    dividing a code field into narrow bar areas; and
    providing two printing units with adjustable printing forms for printing narrow bars
    assigning alternate narrow bar areas to the two different printing units;
    printing the code using both printing units successively in exact register;
    wherein the printing forms are adjustable to all bar combinations in the bar areas assigned to them.

2. The process according to claim 1, comprising the further step of:
    widening the bars in the print format about 10% in or opposite the printing direction.

3. Process according to claim 1 or 2 comprising the further step of:
    printing with a satellite printing system which comprises both said printing units.

4. Process according to claim 3 comprising the further step of:
    permanently providing a first narrow bar at the beginning of each code field and the bars of a start code and stop code in one of the printing units.

5. A device for printing a successive row of numbers of bar code 2/5 interleaved comprising:
    two printing units for printing a single bar code, a plurality of adjustable printing forms on each printing unit, each form representing a narrow bar and the forms being arranged on each unit and spaced from one another whereby narrow bar areas are assigned alternately to the two different printing units permitting printing of narrow bars by individual forms of each printing unit and wide bars by forms of the two units at adjacent assigned narrow bar areas.

6. Device according to claim 5, wherein both printing units comprise numbering units which are divided lengthwise in the middle, wherein each divided numbering unit comprises bar printing formats in three alternating narrow bar areas and their subcombinations.

* * * * *